Sept. 16, 1947.  C. L. WALDECK ET AL  2,427,430
VEHICLE WHEEL
Filed April 4, 1946

INVENTORS:
CHRIST L. WALDECK
JAMES A. DEVER
BY
ATTORNEY.

Patented Sept. 16, 1947

2,427,430

UNITED STATES PATENT OFFICE 2,427,430

VEHICLE WHEEL

Christ L. Waldeck, Cleveland Heights, and James A. Dever, Bay Village, Ohio, assignors to Shuler Company, Cleveland, Ohio, a partnership Application April 4, 1946, Serial No. 659,572

4 Claims. (Cl. 308—191)

This invention relates as indicated to vehicle wheels, but has reference more particularly to wheels of the type used for baby walkers, strollers and the like.

A primary object of the invention is to provide a wheel of the character described having a novel hub construction and ball-bearing mounting.

Another object of the invention is to provide a wheel of the character described having a novel double-row ball-bearing mounting.

A further object of the invention is to provide a wheel of the character described in which the number of parts required for a ball-bearing mounting of the type referred to is reduced to a minimum.

A still further object of the invention is to provide a wheel of the character described, the parts of which are inexpensive to manufacture, and which can be readily assembled into a compact unitary construction.

Other objects and advantages of the invention will be apparent during the course of the following description.

Figure 1:
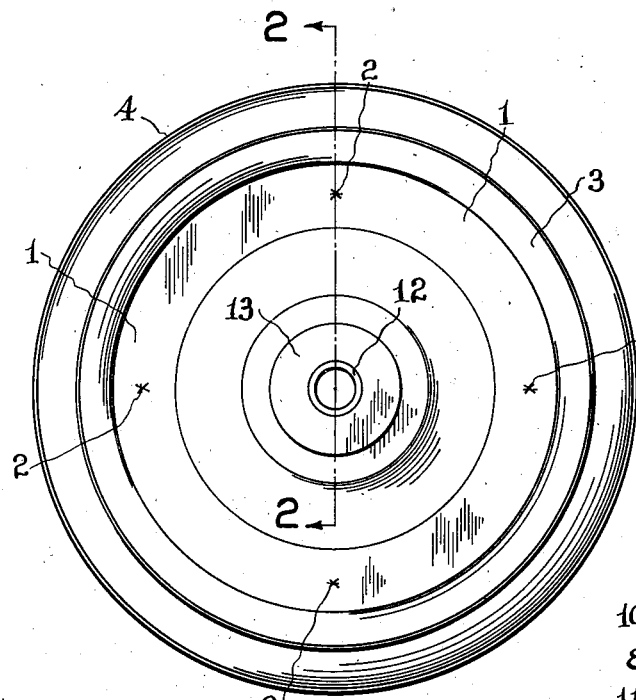
Figure 2:
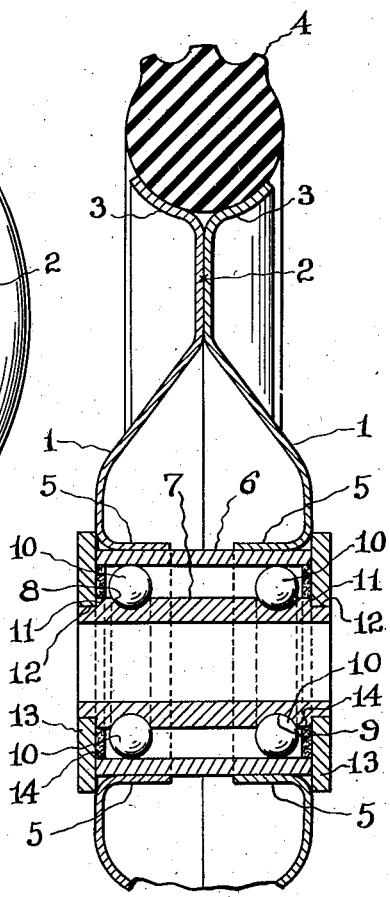
Figure 3:
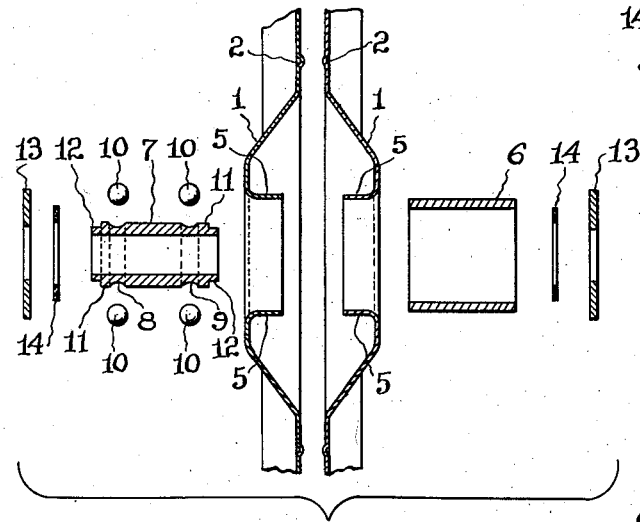

In the accompanying drawings, forming a part of this specification, and in which like numerals are employed to designate like parts throughout the same, Fig. 1 is a side elevational view of a vehicle wheel embodying the novel features of the invention;

Fig. 2 is a fragmentary cross-sectional view, on an enlarged scale, taken on the line 2—2 of Fig. 1, and Fig. 3 is an exploded view of the parts used in the construction of the wheel.

Referring more particularly to the drawings, the wheel will be seen to comprise a pair of disks 1, which are spot welded to each other at circumferentially-spaced points 2 to form a wheel unit, the disks being provided at their peripheries with outwardly extending flanges 3 adapted (when the disks are united) to form a groove for a tire 4.

The disks 1 are also provided at their hub portions with inturned annular flanges 5 in which a sleeve 6 is mounted, the sleeve being secured within said flanges as by a press fit.

Extending centrally through the sleeve 6 is a bearing race 7, which is preferably formed from seamless steel tubing machined to provide axially-spaced annular grooves 8 and 9, forming raceways for ball bearings 10, the inner surface of the sleeve 6 forming the outer race for said ball bearings. The provision of annular grooves 8 and 9 leaves portions 11 adjacent the grooves, which portions are of the same external diameter as the central portion of the bearing race 7.

The ends of the bearing race 7 are machined to provide portions 12 of reduced diameter, upon which washers 13 are secured as by a press fit. Disposed inwardly of the washers 15 are fiber washers 14, which are loosely mounted on the portions 11 of the race 7, and which serve to retain a lubricant which is packed into the space between the race 7 and the sleeve 6.

It will be apparent from the foregoing description that the spacing of the washers 13 is such as to preclude any appreciable axial movement of the bearing race 7 relatively to the sleeve 6.

The aforesaid construction provides a desired double ball-bearing mounting for the wheel, and at the same time, the number of parts utilized in the construction is reduced to a minimum.

It is to be understood that the form of our invention, herewith shown and described, is to be taken as a preferred example of the same, and that various changes in the shape, size and arrangement of parts may be resorted to, without departing frnm the spirit of our invention, or the scope of the subjoined claims.

Having thus described our invention, we claim:

1. A vehicle wheel having a hub portion, a sleeve rigidly mounted in said hub portion, a bearing race member extending through said sleeve, spaced annular rows of ball bearings mounted between said race member and said sleeve, and ball-bearing retainer washers secured to the ends of said race member by a press fit.

2. A vehicle wheel having a hub portion, a sleeve rigidly mounted in said hub portion, a bearing race member extending through said sleeve and having spaced annular grooves therein, annular rows of ball bearings mounted between said race member and said sleeve, said annular grooves forming the inner raceways for said ball bearings, and ball-bearing retainer washers rigidly secured to the ends of said race member.

3. A vehicle wheel having a hub portion, a sleeve rigidly mounted in said hub portion, a bearing race member extending through said sleeve and having ends of reduced diameter, spaced annular rows of ball bearings interposed between said race member and said sleeve, and ball-bearing retainer washers rigidly secured to said reduced ends of said race member.

4. A vehicle wheel having a hub portion, a sleeve rigidly mounted in said hub portion, a bearing race member extending through said sleeve and having spaced annular grooves therein, annular rows of ball bearings interposed between said grooves and said sleeve, said race member having ends of reduced diameter, ball-bearing retainer washers rigidly secured to said reduced ends, and fiber washers interposed between said first-named washers and said ball bearings.

CHRIST L. WALDECK.
JAMES A. DEVER.

REFERENCES CITED

The following references are of record in the file of this patent:

UNITED STATES PATENTS

| Number | Name | Date |
|---|---|---|
| 639,807 | Foidart | Dec. 26, 1899 |
| 1,518,411 | Roe | Dec. 9, 1924 |
| 2,271,432 | Hull et al. | Jan. 27, 1942 |
| 1,181,104 | Beck | May 2, 1916 |
| 1,395,734 | Root | Nov. 1, 1921 |
| 1,457,456 | Petrie | June 5, 1923 |
| 1,665,874 | Casler | Apr. 10, 1928 |
| 2,187,777 | Gannett | Jan. 23, 1940 |

FOREIGN PATENTS

| Number | Country | Date |
|---|---|---|
| 13,589 | France | May 12, 1911 |